(12) United States Patent
Koppisetty et al.

(10) Patent No.: US 11,887,481 B2
(45) Date of Patent: Jan. 30, 2024

(54) REAR VIEW COLLISION WARNING INDICATION AND MITIGATION

(71) Applicant: Volvo Car Corporation, Gothenburg (SE)

(72) Inventors: Ashok Chaitanya Koppisetty, Gothenburg (SE); Mikael Ljung Aust, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 107 days.

(21) Appl. No.: 17/363,144

(22) Filed: Jun. 30, 2021

(65) Prior Publication Data
US 2023/0005373 A1    Jan. 5, 2023

(51) Int. Cl.
*G08G 1/16* (2006.01)
*B60Q 9/00* (2006.01)

(52) U.S. Cl.
CPC ............ *G08G 1/166* (2013.01); *B60Q 9/008* (2013.01); *G08G 1/167* (2013.01)

(58) Field of Classification Search
None
See application file for complete search history.

(56) References Cited

U.S. PATENT DOCUMENTS

| | | | | |
|---|---|---|---|---|
| 3,892,483 A * | 7/1975 | Saufferer | ............... | G08G 1/166 356/28 |
| 7,346,453 B2 * | 3/2008 | Matsuoka | ............... | G08G 1/167 342/70 |
| 8,041,483 B2 * | 10/2011 | Breed | ............... | G01S 7/023 348/148 |
| 9,153,133 B1 * | 10/2015 | Lunsford | ............... | G08G 1/166 |
| 9,454,906 B2 * | 9/2016 | Mühlenberg | ............ | G01S 7/2813 |
| 9,656,606 B1 * | 5/2017 | Vose | ............... | G01S 19/42 |
| 9,792,509 B2 * | 10/2017 | Nitschke | ............... | B60W 30/12 |
| 10,347,132 B1 * | 7/2019 | Chandrakumar | ...... | B60Q 5/006 |

(Continued)

FOREIGN PATENT DOCUMENTS

DE    102012215014 A1 *    2/2014    ............ B60W 30/08

OTHER PUBLICATIONS

Extended European Search Report for EP Patent Application Serial No. 22181558.2 dated Nov. 23, 2022, 9 pages.

(Continued)

*Primary Examiner* — Muhammad Adnan
(74) *Attorney, Agent, or Firm* — Amin, Turocy & Watson, LLP

(57) ABSTRACT

A device can comprise a memory and a processor operatively coupled to the memory and comprising computer executable components, comprising a trajectory determination component that determines a trajectory of an adjacent-lane traveling vehicle traveling in a lane adjacent to a vehicle comprising the device, wherein visibility of the adjacent-lane traveling vehicle, from the vehicle, is impaired by a succeeding vehicle traveling between the adjacent-lane traveling vehicle and the vehicle, a collision avoidance component that, in response to the trajectory of the adjacent-lane traveling vehicle being determined, by the trajectory determination component, to prevent a safe lane change by the vehicle to the lane, initiates a collision avoidance action for the vehicle.

20 Claims, 15 Drawing Sheets

(56) References Cited

U.S. PATENT DOCUMENTS

| | | | | |
|---|---|---|---|---|
| 2012/0105959 | A1* | 5/2012 | Allen | G02B 5/124 359/528 |
| 2014/0152473 | A1* | 6/2014 | Muhlenberg | G08G 1/166 340/933 |
| 2014/0218213 | A1* | 8/2014 | Schneider | B60Q 9/008 340/905 |
| 2015/0016678 | A1* | 1/2015 | Imaeda | B60W 40/072 382/103 |
| 2015/0266510 | A1* | 9/2015 | Bang | G08G 1/166 701/41 |
| 2016/0144853 | A1* | 5/2016 | Stenneth | G08G 1/096758 701/1 |
| 2016/0221575 | A1* | 8/2016 | Posch | B60W 50/10 |
| 2018/0022351 | A1* | 1/2018 | Habu | G08G 1/166 701/96 |
| 2018/0148060 | A1* | 5/2018 | Hashimoto | B60W 30/18163 |
| 2018/0255562 | A1* | 9/2018 | Cho | H04W 4/42 |
| 2018/0281804 | A1* | 10/2018 | Talamonti | G05D 1/0212 |
| 2019/0317499 | A1* | 10/2019 | Imai | B60W 50/0098 |
| 2019/0347939 | A1* | 11/2019 | Kim | B60K 35/00 |
| 2020/0086789 | A1* | 3/2020 | Nowakowski | B60R 1/00 |
| 2020/0126424 | A1* | 4/2020 | Raichelgauz | G08G 1/16 |
| 2020/0139974 | A1* | 5/2020 | Schreiber | G08G 1/167 |
| 2020/0277008 | A1* | 9/2020 | Tran | B60R 1/00 |
| 2020/0327338 | A1* | 10/2020 | Philion | G06F 18/214 |
| 2021/0089039 | A1* | 3/2021 | Schultz | G05D 1/0221 |
| 2021/0110484 | A1* | 4/2021 | Shalev-Shwartz | B60W 10/18 |
| 2021/0171027 | A1* | 6/2021 | Kang | G08G 1/012 |
| 2022/0026567 | A1* | 1/2022 | Yoshitake | G01S 13/931 |
| 2022/0073073 | A1* | 3/2022 | Hong | G05D 1/0293 |
| 2022/0206153 | A1* | 6/2022 | Aiso | G01S 17/89 |
| 2022/0379924 | A1* | 12/2022 | Foster | B60W 30/16 |
| 2022/0415179 | A1* | 12/2022 | Kumar | H04W 4/46 |

OTHER PUBLICATIONS

Communication pursuant to Rule 69 EPC for EP Patent Application Serial No. 22181558.2 dated Jan. 10, 2023, 2 pages.

* cited by examiner

REAR VIEW COLLISION WARNING INDICATION AND MITIGATION

BACKGROUND

One or more embodiments herein relate to blind spot monitoring, and more specifically, to collision indication, and to mitigation from a collision with an overtaking vehicle.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate collision mitigation.

Vehicles structures inherently cause some spots/areas outside of the vehicle to be difficult for a respective driver to see (e.g., blind spots). As a result, blind spot monitoring/information systems have been developed to help prevent collisions with other vehicles, or objects, located in a such a blind spot. Such blind spot monitoring/information systems are rapidly becoming commonplace in vehicles. Such systems can play an integral role on an overall vehicle safety systems. Such systems, however, are generally only capable of monitoring blind spots in a straight driving lane. Further, such systems generally only monitor a small blind spot or region nearby a vehicle. Therefore, there exists a need for improved blind spot monitoring and/or associated collision mitigation systems.

According to an embodiment, a device comprises a memory, and a processor operatively coupled to the memory and comprising computer executable components comprising: a trajectory determination component that determines a trajectory of an adjacent-lane traveling vehicle traveling in a lane adjacent to a vehicle comprising the device, wherein visibility of the adjacent-lane traveling vehicle, from the vehicle, is impaired by a succeeding vehicle traveling between the adjacent-lane traveling vehicle and the vehicle; and a collision avoidance component that, in response to the trajectory of the adjacent-lane traveling vehicle being determined, by the trajectory determination component, to prevent a safe lane change by the vehicle to the lane, initiates a collision avoidance action for the vehicle.

According to another embodiment, a computer-implemented method comprises determining, by a device comprising a processor, a trajectory of an adjacent-lane traveling vehicle traveling in a lane adjacent to a vehicle comprising the device, wherein visibility of the adjacent-lane traveling vehicle, from the vehicle, is impaired by a succeeding vehicle traveling between the adjacent-lane traveling vehicle and the vehicle; and in response to the trajectory of the adjacent-lane traveling vehicle being determined to prevent a safe lane change by the vehicle to the lane, initiating, by the device, a collision avoidance action for the vehicle.

According to yet another embodiment, a non-transitory machine-readable medium, comprising executable instructions that, when executed by a processor, facilitate performance of operations, comprising determining a trajectory of an adjacent-lane traveling vehicle traveling in a lane adjacent to a vehicle, wherein visibility of the adjacent-lane traveling vehicle, from the vehicle, is impaired by a succeeding vehicle traveling between the adjacent-lane traveling vehicle and the vehicle; and in response to the trajectory of the adjacent-lane traveling vehicle being determined to prevent a safe lane change by the vehicle to the lane, initiating a collision avoidance action for the vehicle.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being "coupled" to another element, it can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling, and/or another type of coupling. As referenced herein, an "entity" can comprise a human, a client, a user, a computing device, a software application, an agent, a machine learning model, an artificial intelligence, and/or another entity. It should be appreciated that such an entity can facilitate implementation of the subject disclosure in accordance with one or more embodiments the described herein.

Figure 1:
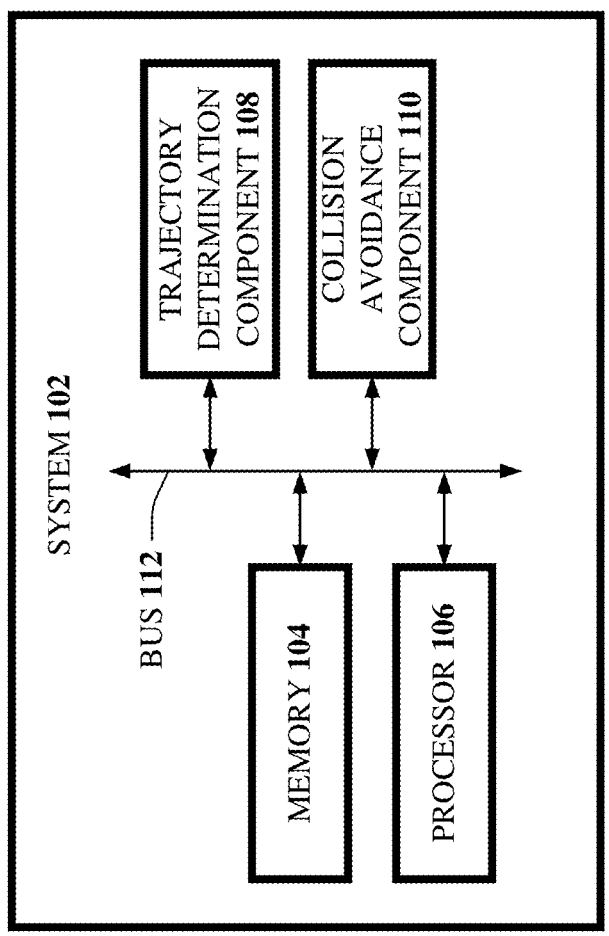
FIG. 1 illustrates a block diagram of an example, non-limiting collision mitigation system in accordance with one or more embodiments described herein.

FIG. 1 illustrates a block diagram of an example, non-limiting system 102 in accordance with one or more embodiments described herein. System 102 can comprise a memory 104, a processor 106, a trajectory determination component 108, a collision avoidance component 110, and/or a bus 112. In various embodiments, one or more of the memory 104, processor 106, trajectory determination component 108, collision avoidance component 110, and/or bus 112, can be communicatively or operably coupled to one another to perform one or more functions of the system 102.

According to an embodiment, the trajectory determination component 108 can determine a trajectory of an adjacent-lane traveling vehicle traveling in a lane adjacent to a vehicle (e.g., a vehicle comprising the system 102). It is noted that the trajectory determination component 108 can determine the trajectory of the adjacent-lane traveling vehicle when visibility of the adjacent-lane traveling vehicle is impaired (e.g., to a driver of a vehicle comprising the system 102) by a succeeding vehicle traveling between the adjacent-lane traveling vehicle and the vehicle comprising the system 102. The trajectory determination component 108 can determine the trajectory of the adjacent-lane traveling vehicle using a sensor or a combination of sensors (e.g., as later discussed herein). It is noted that the trajectory determination component 108 can determine the trajectory of the adjacent-lane traveling vehicle by determining a current/instant trajectory of the adjacent-lane traveling vehicle and/or front/rear wheel directions of the adjacent-lane traveling vehicle, among other suitable information. The trajectory determination component 108 can further consider other relevant information when determining the trajectory of the adjacent-lane traveling vehicle, such as distance to another vehicle, speed, acceleration, previous observed overtaking maneuvers, turn signal status (e.g., driver side blinking turn signal can indicate an intent to make a turn in that direction or change lanes in that direction), visual cues such as hand-signals, or other suitable information.

In an embodiment, the collision avoidance component 110 can, in response to a trajectory of an adjacent-lane traveling vehicle being determined, by the trajectory determination component 108, to prevent a safe lane change by the vehicle to the lane, initiate a collision avoidance action for the vehicle (e.g., the vehicle comprising the system 102). It is noted that a safe lane change can comprise a lane change with a minimal risk of a collision (e.g., as determined by the collision avoidance component 110 using the trajectory of the adjacent-lane traveling vehicle determined by the trajectory determination component 108 and/or a trajectory of the vehicle comprising the system 102, in addition to other suitable information). Such a risk can be compared to a defined collision risk threshold. A collision risk below such a threshold (e.g., as determined by the collision avoidance component 110) can comprise an acceptable risk, and a collision risk above such a threshold can comprise unacceptable risk (e.g., adjacent-lane traveling vehicle preventing a safe lane change).

According to an embodiment, a collision avoidance action herein can comprise one or more of a variety of actions, depending on context conditions and/or vehicle capabilities or settings. For instance, such a collision avoidance action can comprise an audible or visual warning displayed in/on the vehicle comprising the system 102. In another embodiment, the collision avoidance action can comprise haptic feedback (e.g., on a steering wheel of the vehicle comprising the system 102. In further embodiments, the collision avoidance action can comprise autonomous control over a vehicle comprising the system 102 in order to avoid such a collision (e.g., autonomously steering away from an impact zone or autonomously accelerating/decelerating in order to avoid such a collision).

Memory 104 can store one or more computer/machine readable and/or executable components and/or instructions that, when executed by processor 106 (e.g., a classical processor, a quantum processor, a tensor processing unit etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to system 102, trajectory determination component 108, collision avoidance component 110, or other components (e.g., as later described herein). Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. It can be appreciated that the memory 104 can store data herein.

Processor 106 can comprise one or more types of processors and/or electronic circuitry (e.g., a classical processor, graphics processor, a tensor processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, tensor processor, Application Specific Integrated Circuit (ASIC) and/or another type of processor.

Bus 112 can comprise one or more memory bus, memory controller, peripheral bus, external bus, local bus, a quantum bus, and/or another type of bus that can employ various bus architectures (e.g., industrial standard architecture (ISA), extended ISA (EISA), micro-channel architecture (MSA), intelligent drive electronics (IDE), advanced graphics port (AGP), VESA local bus (VLB), peripheral component interconnect (PCI), universal serial bus (USB), card bus, small computer systems interface (SCSI), firewire (IEEE 1394), etc.).

Figure 2:
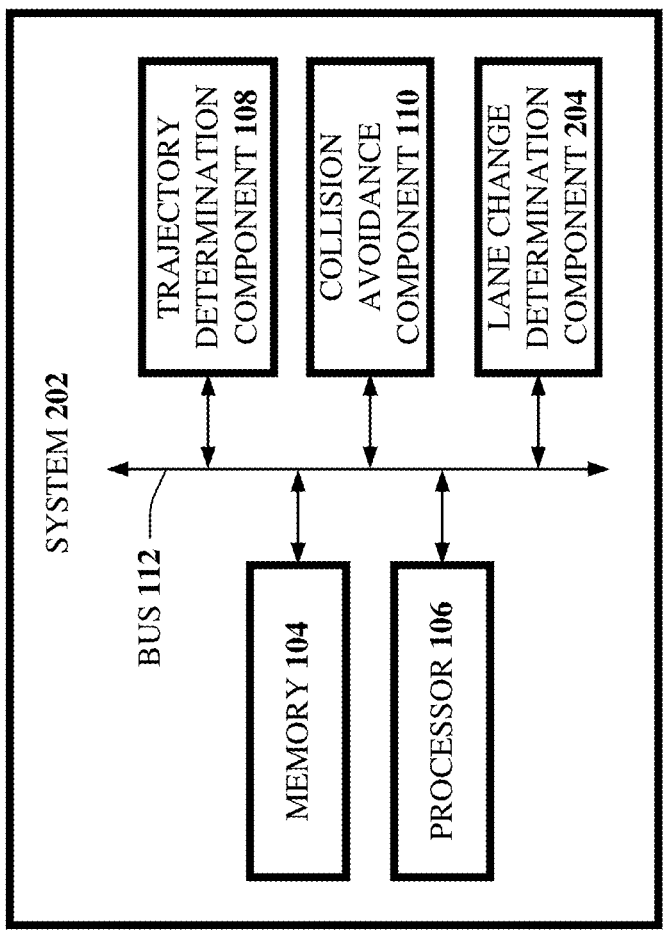
FIG. 2 illustrates a block diagram of an example, non-limiting collision mitigation system in accordance with one or more embodiments described herein.

FIG. 2 illustrates a block diagram of an example, non-limiting system 202 in accordance with one or more embodiments described herein. System 202 can be similar to system 102, and can comprise a memory 104, processor 106, trajectory determination component 108, collision avoidance component 110, and/or bus 112. Repetitive description of like elements and/or processes employed in respective embodiments is omitted for sake of brevity.

System 202 can additionally comprise a lane change determination component 204. In various embodiments, one or more of the memory 104, processor 106, trajectory determination component 108, collision avoidance component 110, bus 112, and/or lane change determination component 204 can be communicatively or operably coupled to one another to perform one or more functions of the system 202.

According to an embodiment, the lane change determination component 204 can determine whether a vehicle comprising the system 202 is going to attempt a lane change (or is attempting a lane change). The lane change determination component 204 can determine whether the vehicle is going to attempt a lane change (or is currently attempting a lane change) based on various information utilize various sensors or information otherwise available to the system 202 (e.g., over a CAN Bus network of the vehicle comprising the system 202), such a vehicle speed, distance to other vehicles, vehicle trajectory, wheel speed, wheel angle, driver eye movement, vehicle acceleration or deceleration, navigation/mapping instructions or route information, audible or visual cues, or other suitable information. According to an embodiment, in response to a determination by the lane change determination component 204 that the vehicle is going to attempt a lane change (or is attempting a lane change), the collision avoidance component 110 can initiate the collision avoidance action.

It is noted that, according to an embodiment, a vehicle comprising the system 202 can be traveling on a road (e.g., comprising the lane on which the vehicle is traveling) between a preceding vehicle traveling in the same lane as the vehicle comprising the system 202 and the succeeding vehicle. In this regard, the determination, by the lane change determination component 204, that the vehicle comprising the system 202 is going to attempt the lane change can comprise a determination by the lane change determination component 204 that the vehicle comprising the system 202 is going to attempt the lane change to overtake the preceding vehicle. In one or more embodiments, such a road can comprise a curved road (e.g., a road on which a vehicles must turn or bank in order to remain in a respective lane). In other embodiments, such a road can comprise a straight road.

Figure 3:
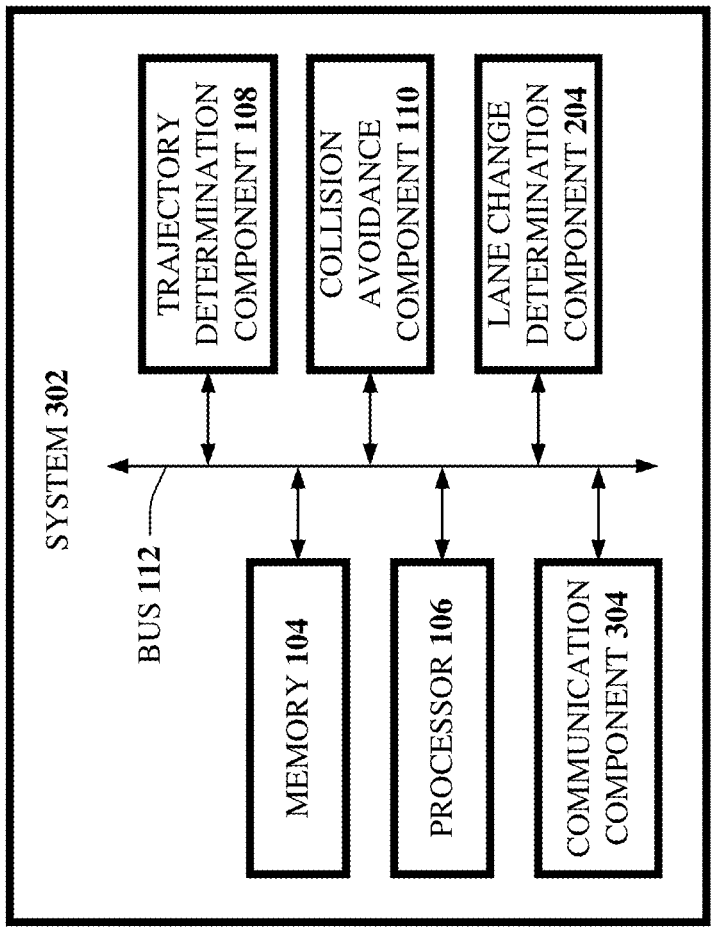
FIG. 3 illustrates a block diagram of an example, non-limiting collision mitigation system in accordance with one or more embodiments described herein.

FIG. 3 illustrates a block diagram of an example, non-limiting system 302 in accordance with one or more embodiments described herein. System 302 can be similar to system 202, and can comprise a memory 104, processor 106, trajectory determination component 108, collision avoidance component 110, bus 112, and/or lane change determination component 204. Repetitive description of like elements and/or processes employed in respective embodiments is omitted for sake of brevity.

System 302 can additionally comprise a communication component 304. In various embodiments, one or more of the memory 104, processor 106, trajectory determination component 108, collision avoidance component 110, bus 112, and/or lane change determination component 204, and/or communication component 304 can be communicatively or operably coupled to one another to perform one or more functions of the system 302.

According to an embodiment, the communication component 304 can receive warning information comprising a potential collision between a vehicle comprising the system 302 and an adjacent-lane traveling vehicle from a preceding vehicle, or from another vehicle. In an embodiment, a trajectory of an adjacent-lane traveling vehicle can be further determined, by the trajectory determination component 108, based on such warning information. It is noted that the communication component 304 can facilitate direct vehicle-to-vehicle communication in order to receive or transmit warning information to/from other vehicles. In this regard, nearby vehicles (e.g., within a defined range or within a geographic region) can communicate with one another to share warning information or information concerning locations or trajectories of other surrounding vehicles, or of their own respective locations or trajectories. Likewise, the communication component 304 can facilitate cloud-based communication (e.g., via a network such as a cellular network) in order to communicate with other such vehicles.

According to an embodiment, the communication component 304 can comprise the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, global system for mobile communications ("GSM"), code-division multiple access ("CDMA"), satellite, visual cues, radio waves, etc.)

Figure 4:
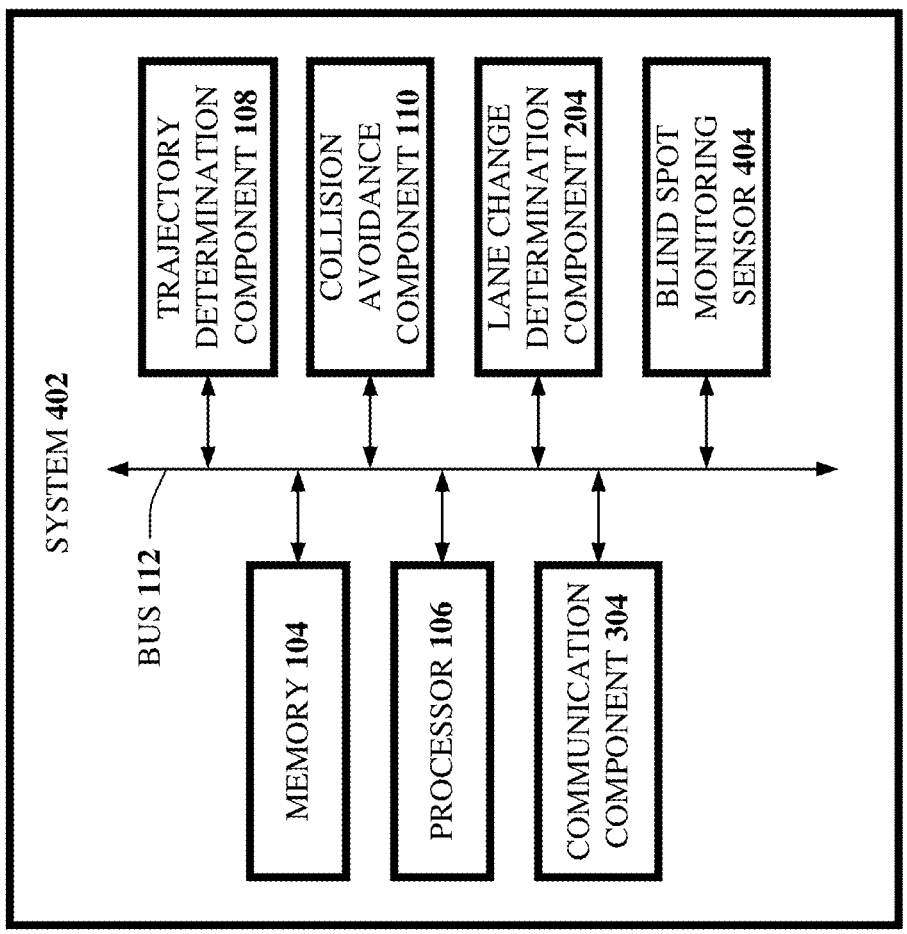
FIG. 4 illustrates a block diagram of an example, non-limiting collision mitigation system in accordance with one or more embodiments described herein.

FIG. 4 illustrates a block diagram of an example, non-limiting system 402 in accordance with one or more embodiments described herein. System 402 can be similar to system 302, and can comprise a memory 104, processor 106, trajectory determination component 108, collision avoidance component 110, bus 112, and/or lane change determination component 204, and/or communication component 304. Repetitive description of like elements and/or processes employed in respective embodiments is omitted for sake of brevity.

System 402 can additionally comprise a blind spot monitoring sensor 404. In various embodiments, one or more of the memory 104, processor 106, trajectory determination component 108, collision avoidance component 110, bus 112, and/or lane change determination component 204, communication component 304, and/or blind spot monitoring sensor 404 can be communicatively or operably coupled to one another to perform one or more functions of the system 402.

According to an embodiment, the blind spot monitoring sensor 404 can comprise a sensor of the system 402 (or of a vehicle comprising the system 402 and communicatively coupled to the system 402). In this regard, the trajectory determination component 108 can determine a trajectory of a vehicle (e.g., an adjacent-lane traveling vehicle) based on an output received from the blind spot monitoring sensor 404. It is noted that the blind spot monitoring sensor 404 can comprise one or more of a variety of sensors. In this regard, the blind spot monitoring sensor 404 can comprise a group of sensors, or can comprise a singular sensor.

According to an embodiment, the blind spot monitoring sensor 404 can comprise a camera (e.g., a rear-facing camera with respect to a vehicle comprising the system 402). According to an example, the blind spot monitoring sensor 404 can comprise multiple cameras (e.g., a pair of cameras) to employ stereo vision for improved depth perception. In another embodiment, the blind spot monitoring sensor 404 can comprise a radar sensor. In yet another embodiment, the blind spot monitoring sensor 404 can comprise a lidar sensor, or another suitable sensor.

In various embodiments, one or more of the foregoing sensors can be utilized individually or collectively (e.g., sensor fusion).

Figure 5:
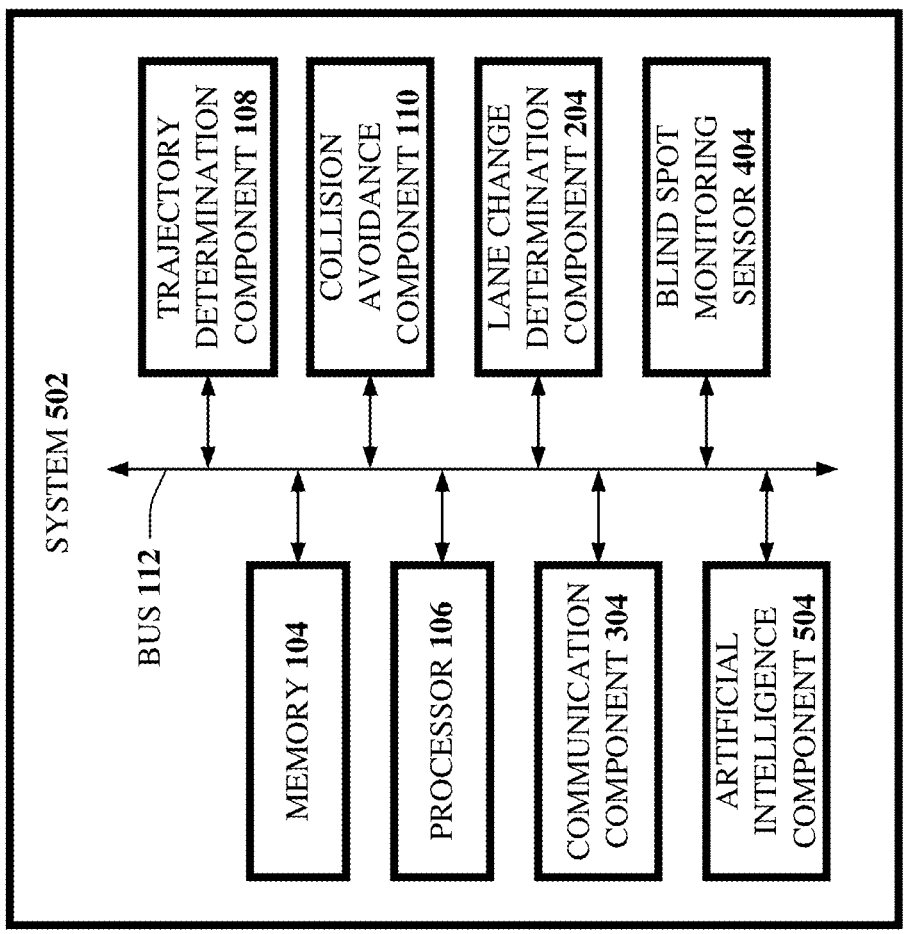
FIG. 5 illustrates a block diagram of an example, non-limiting collision mitigation system in accordance with one or more embodiments described herein.

FIG. 5 illustrates a block diagram of an example, non-limiting system 502 in accordance with one or more embodiments described herein. System 502 can be similar to system 402, and can comprise a memory 104, processor 106, trajectory determination component 108, collision avoidance component 110, bus 112, and/or lane change determination component 204, communication component 304, and/or blind spot monitoring sensor 404. Repetitive description of like elements and/or processes employed in respective embodiments is omitted for sake of brevity.

System 502 can additionally comprise an artificial intelligence component 504. In various embodiments, one or more of the memory 104, processor 106, trajectory determination component 108, collision avoidance component 110, bus 112, and/or lane change determination component 204, communication component 304, blind spot monitoring sensor 404, and/or artificial intelligence component 504 can be communicatively or operably coupled to one another to perform one or more functions of the system 502.

Artificial-intelligence or machine learning systems and techniques can be employed (e.g., using the artificial intelligence component 504) to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

According to an embodiment, the artificial intelligence component 504 can utilize machine learning applied to past adjacent-lane traveling vehicle information representative of past trajectories of adjacent-lane traveling vehicles (e.g., from prior to experiencing the adjacent-lane traveling vehicle), to determine the trajectory of another vehicle (e.g., the adjacent-lane traveling vehicle). In this regard, the artificial intelligence component 504 can generate a trajectory prediction model employable for the prediction of trajectories of vehicles herein (e.g., a vehicle comprising the system 502 or other surrounding vehicles). It is noted that such a trajectory prediction model can be continuously improved over time, based on comparing trajectory predictions (e.g., as predicted by the artificial intelligence component 504) and/or actual trajectories taken by respective vehicles. It is noted that the collision avoidance component 110 can be employable to mitigate a collision based on such predictions made by the artificial intelligence component 504 and/or trajectory determination component 108. In this regard, the artificial intelligence component 504 can be employable (e.g., by the trajectory determination component 108) in order to improve such trajectory determinations or to generate the model for which the trajectory determination component 108 bases such trajectory determinations/predictions.

In another embodiment, the artificial intelligence component 504 can learn optimal collision avoidance actions (e.g., based on comparisons of collision avoidance actions taken, such as by the collision avoidance component 110 and a rate of success of such collision avoidance actions). In this regard, the artificial intelligence component 504 can generate a collision avoidance model employable for optimizing collision avoidance actions based on probabilities of success and/or a cost of not taking such an action or taking a different action.

According to an embodiment, artificial intelligence component 504 can comprise and/or employ an artificial intelligence (AI) model and/or a machine learning (ML) model that can learn to perform the above or below described functions (e.g., via training using historical training data and/or feedback data).

In some embodiments, artificial intelligence component 504 can comprise an AI and/or ML model that can be trained (e.g., via supervised and/or unsupervised techniques) to perform the above-described functions using historical training data comprising various context conditions. In this example, such an AI and/or ML model can further learn (e.g., via supervised and/or unsupervised techniques) to perform the above-described functions using training data comprising feedback data, where such feedback data can be collected and/or stored (e.g., in memory 104) by artificial intelligence component 504. In this example, such feedback data can comprise the various instructions described above/below that can be input, for instance, to a system 502, over time in response to observed/stored context-based information. In some embodiments, based on learning to perform the functions described above, artificial intelligence component 504 can perform such functions in the same manner and/or using the same resources as those of the trajectory determination component 108, collision avoidance component 110, bus 112, lane change determination component 204, communication component 304, and/or blind spot monitoring sensor 404.

Artificial intelligence component 504 can initiate an operation based on a defined level of confidence determined using information (e.g., feedback data). For example, based on learning to perform such functions described above using the above defined feedback data, artificial intelligence component 504 can initiate an operation if it determines, based on such feedback data, a vehicle comprising the system 502 or a surround vehicle is/will take a specific trajectory or navigational operation. For instance, based on learning to perform such functions described above using the above defined feedback data, artificial intelligence component 504 can determine appropriate corresponding actions.

In an embodiment, artificial intelligence component 504 can perform a utility-based analysis that factors cost of initiating the above-described operations versus benefit. In this embodiment, artificial intelligence component 504 can use one or more additional context conditions to determine whether any action should be taken.

To facilitate the above-described functions, artificial intelligence component 504 can perform classifications, correlations, inferences, and/or expressions associated with principles of artificial intelligence. For instance, artificial intelligence component 504 can employ an automatic classification system and/or an automatic classification. In one example, artificial intelligence component 504 can employ a probabilistic and/or statistical-based analysis (e.g., factoring into the analysis utilities and costs) to learn and/or generate inferences. Artificial intelligence component 504 can employ any suitable machine-learning based techniques, statistical-based techniques and/or probabilistic-based techniques. For example, artificial intelligence component 504 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, artificial intelligence component 504 can perform a set of machine learning computations. For instance, artificial intelligence component 504 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 6:
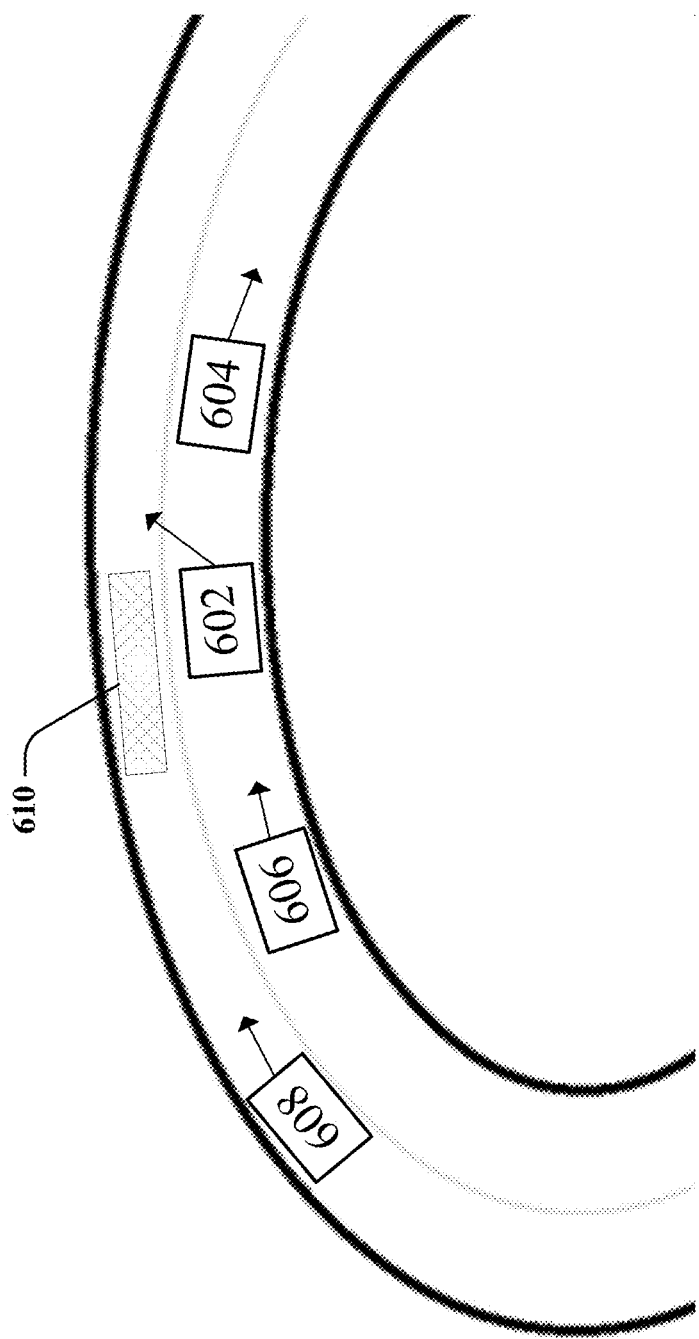
FIG. 6 is a depiction of an example, non-limiting driving scenario in accordance with one or more embodiments described herein.

Turning now to FIG. 6, there is illustrated an exemplary driving scenario in accordance with one or more embodiments described herein. As referenced herein, vehicle 602 can represent a vehicle (e.g., comprising a system herein), vehicle 604 can represent a preceding vehicle, vehicle 606 can represent a succeeding vehicle, and vehicle 608 can represent an adjacent lane traveling vehicle. Coverage area 610 can represent a coverage area of a conventional blind spot monitoring system. In this regard, vehicle 608 is not observable by the vehicle 602 or of a driver of the vehicle 602, because vehicle 608 is not within the coverage area 610 and is obstructed from view of a driver of the vehicle 602 by the vehicle 606. In this situation, a lane change by vehicle 602 into the adjacent lane (as illustrated in FIG. 7) can lead to a potential collision between the vehicle 602 and the vehicle 608.

Figure 7:
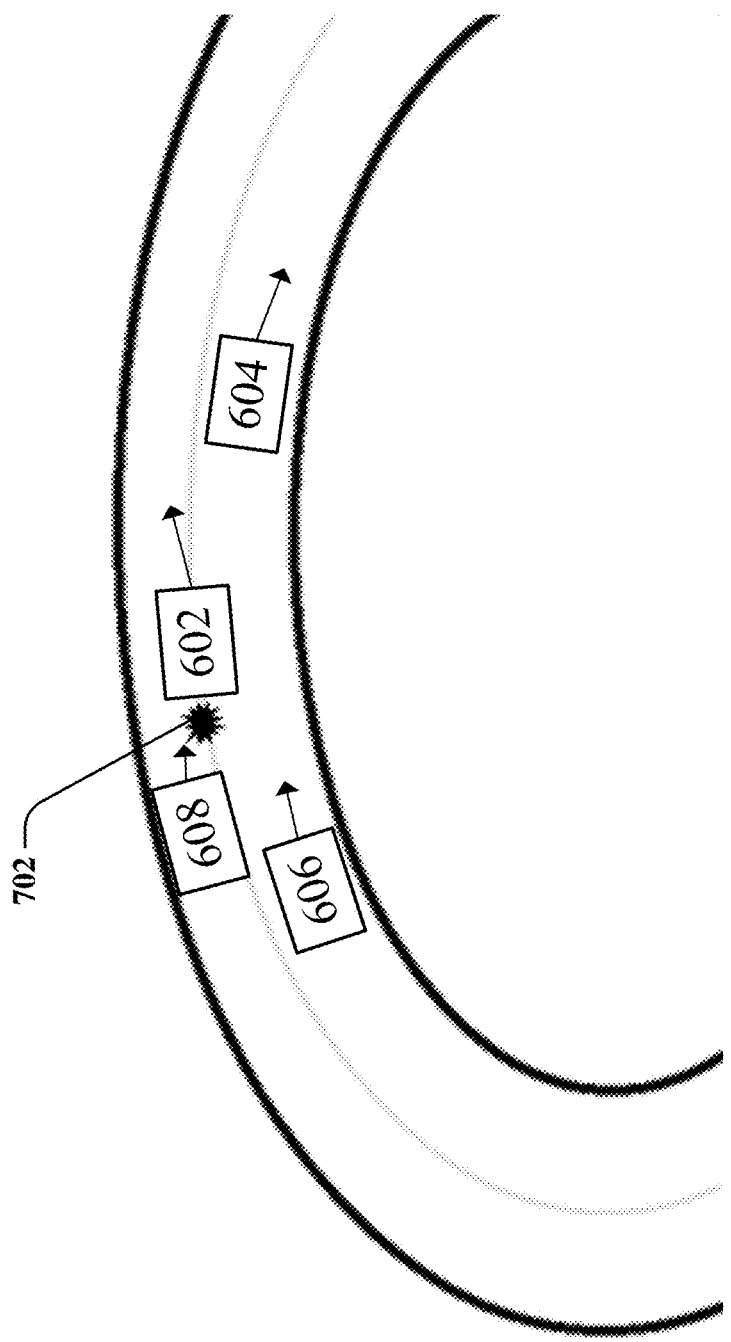
FIG. 7 is a depiction of an example, non-limiting driving scenario in accordance with one or more embodiments described herein.
Figure 8:
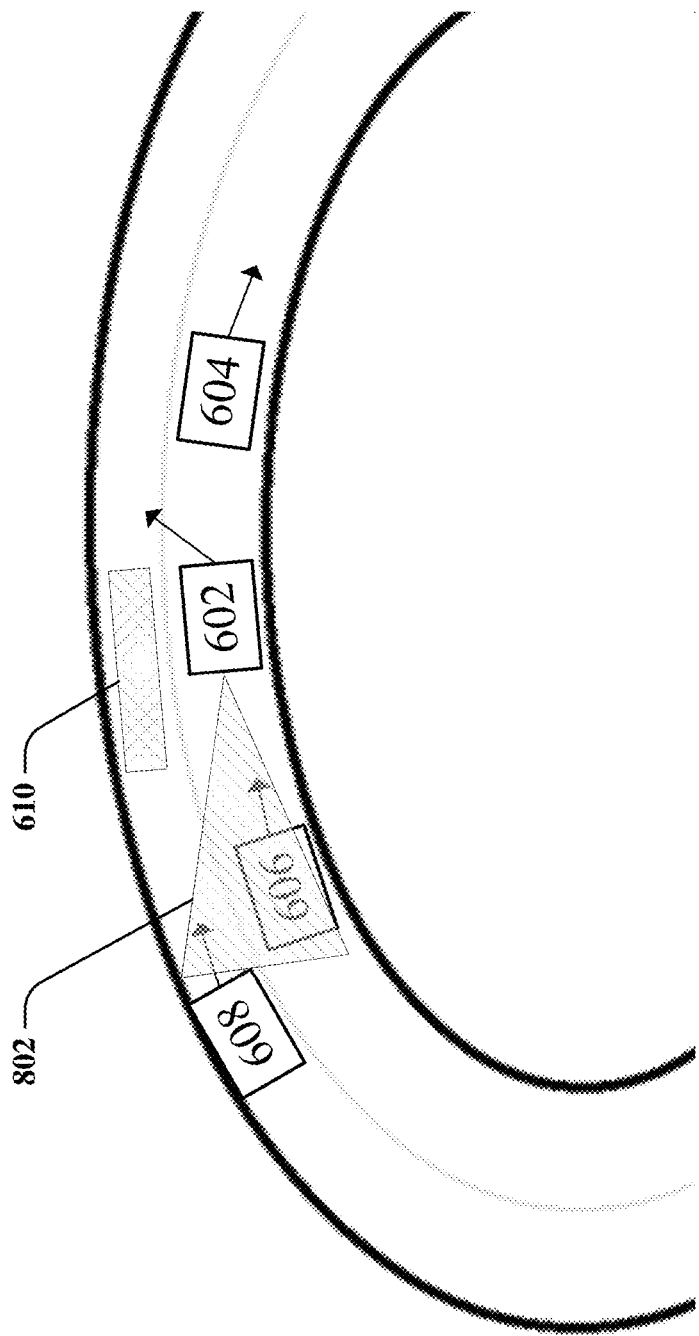
FIG. 8 is a depiction of an example, non-limiting driving scenario in accordance with one or more embodiments described herein.

With reference to FIG. 8, a scenario similar to FIG. 7 is illustrated, however, in FIG. 8, the vehicle 602 comprises a system 102, system 202, system 302, system 402, or system 502. In FIG. 8, a sensor (e.g., blind spot monitoring sensor 404) can facilitate a coverage area 802. The blind spot monitoring sensor 404 is therefore employable to track vehicle 608 and enable a system herein to determine/predict a current or future trajectory of the vehicle 608. In this regard, intent of the vehicle 608 can be predicted (e.g., before a view of the vehicle 608 is obstructed by another vehicle such as the vehicle 606) so that an appropriate collision mitigation action can be enabled and facilitated. In this regard, vehicle 608 can be engaging an in an overtaking maneuver of vehicle 606, vehicle 602, and or vehicle 604. In this scenario, vehicle 608 can be traveling faster than the vehicle 606 and/or vehicle 602. Prediction of the intent and/or trajectory of the vehicle 608 can enable a collision avoidance component 110 to initiate an appropriate collision avoidance action (e.g., if a lane change by vehicle 602 is unsafe and/or attempting to be undertaken) in order to mitigate a collision between the vehicle 602 and the vehicle 608.

Figure 9:
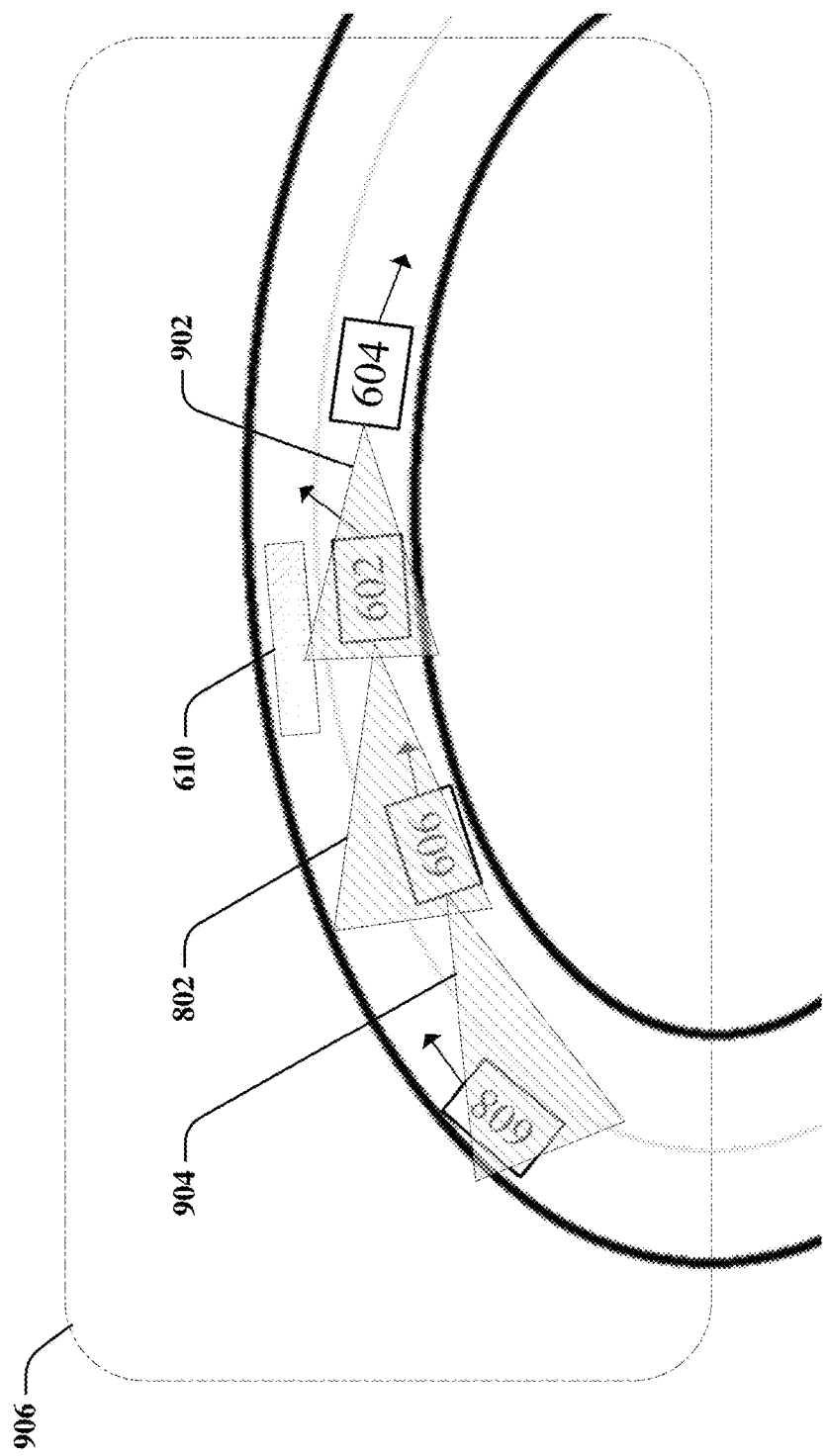
FIG. 9 is a depiction of an example, non-limiting driving scenario in accordance with one or more embodiments described herein.

Turning now to FIG. 9, there is illustrated a scenario in which each of vehicles 602, 604, and 606 comprise a respective system 102, system 202, system 302, system 402, and/or system 502. It is noted that vehicles 602, 604, and 606 can be located in a defined geographic risk zone 906. According to an embodiment, the defined geographic risk zone 906 can be determined (e.g., by the artificial intelligence component 504) based on historical data (e.g., comprising an elevated rate of collision mitigation actions taken by one or more vehicles or an elevated rate of vehicle collision). In this regard, an elevated rate of collision mitigation actions or collisions can be determined based on a comparison of said historical data to a collision mitigation threshold or a collision threshold. In one or more embodiments, the artificial intelligence component 504 can learn to determine such thresholds. Further in this regard, the defined geographic risk zone 906 can be determined using machine learning applied to collision information representative of past collisions, or near-misses of other vehicles, to determine the defined geographic risk zone 906.

According to an embodiment, vehicles 602, 604, and 606 can communicate via direct vehicle-to-vehicle communication (e.g., using respective communication components 304). It is noted that vehicles 602, 604, and 606 can each comprise respective blind spot monitoring sensors 404. In this regard, each of the vehicles 602, 604, and 606 can communicate with one another to share raw captured data (e.g., from the blind spot monitoring sensors 404), trajectory determinations or predictions of respective vehicles or other vehicles, collision mitigation actions undertaken, or other suitable information.

In an embodiment, such vehicle-to-vehicle communication can be initiated upon entering the defined geographic risk zone 906. In other embodiments, such vehicle-to-vehicle communication can be initiated upon entering a defined range of another vehicle capable of such vehicle-to-vehicle communication.

In yet another embodiment, vehicle 608 can additionally comprise a system 102, system 202, system 302, system 402, or system 502, and can directly communicate its own intent (or its own predicted intent) to other vehicles, such as vehicle 602, vehicle 604, and/or vehicle 606. Likewise, vehicles 602, 604, and/or 606 can directly communicate their own respective intents or predicted intents for trajectories or navigational operations.

Figure 10:
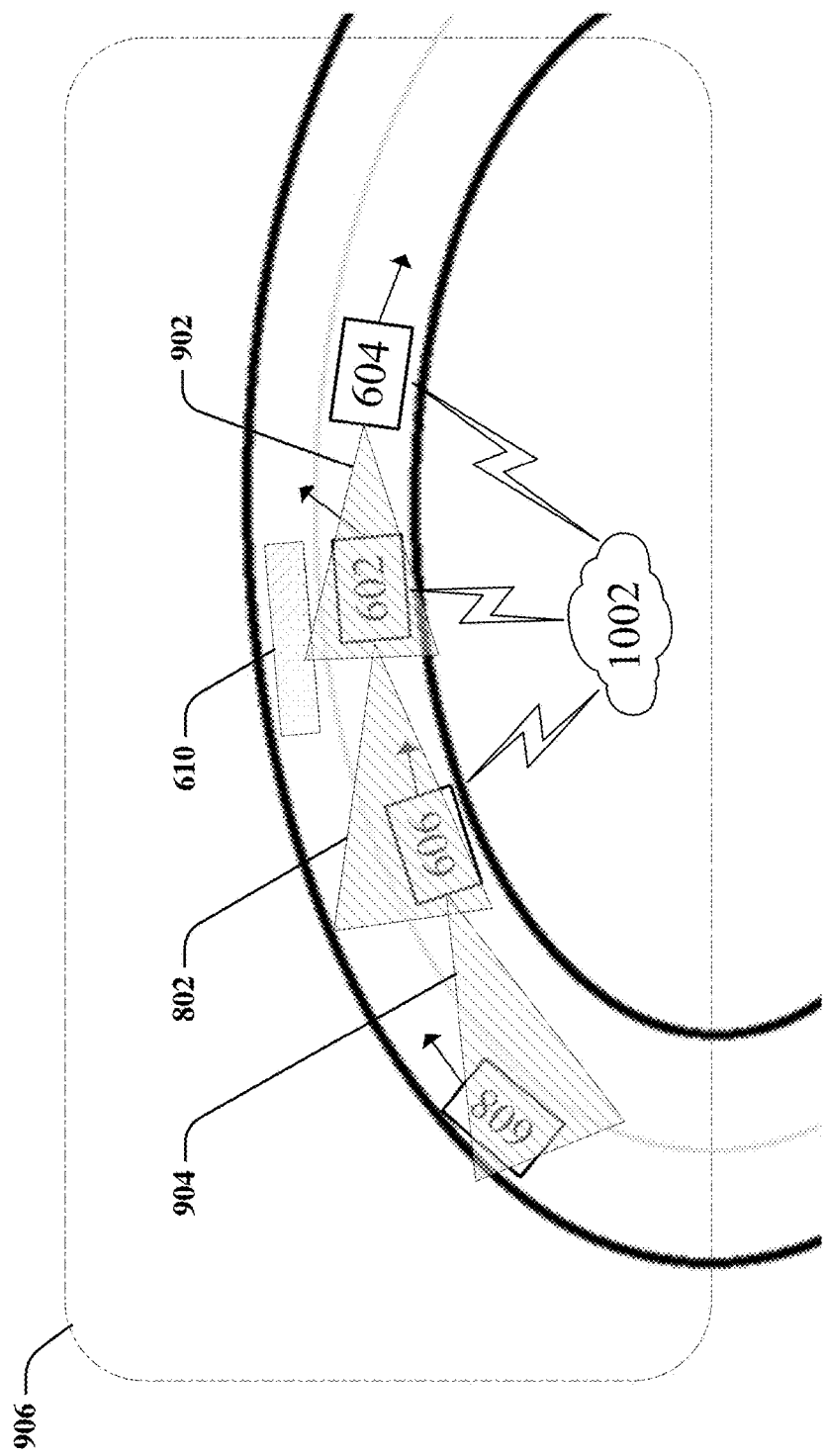
FIG. 10 is a depiction of an example, non-limiting driving scenario in accordance with one or more embodiments described herein.

FIG. 10 illustrates a scenario similar to that of FIG. 9. In FIG. 10, however, rather than utilizing vehicle-to-vehicle communication, vehicles 602, 604, and 606 can utilize cloud-based communication, in which vehicles 602, 604, and 606 communicate with one another via a network (e.g., a network 1002, such as a cellular network, using respective communication components 304).

Figure 11:
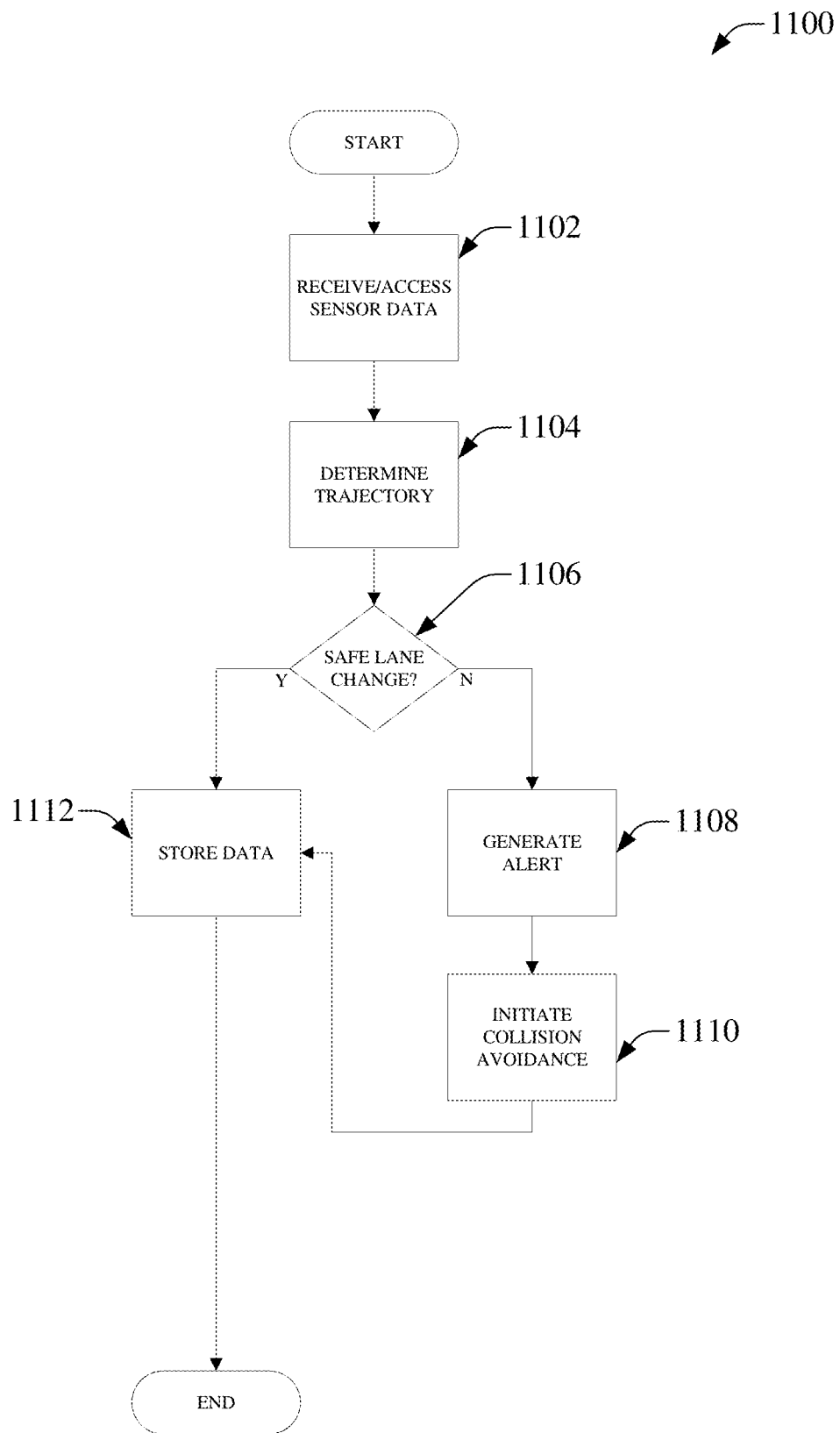
FIG. 11 is an exemplary flowchart of a process for mitigating a collision in accordance with one or more embodiments described herein.

FIG. 11 illustrates a flow chart of an example, non-limiting flowchart of a process 1100 for collision mitigation in accordance with one or more embodiments described herein. At 1102, data can be received or accessed (e.g., from a blind spot monitoring sensor 404). At 1104, a trajectory of a vehicle (e.g., an adjacent lane traveling vehicle such as the vehicle 608) can be determined (e.g., by the trajectory determination component 108). At 1106, if a lane change can be safely executed (e.g., as determined by the collision avoidance component 110) (e.g., Y at 1106), the process can proceed to 1112, at which data relating to the safe lane change (e.g., vehicle speed, vehicle trajectory, distances between vehicles, location information, corresponding adjacent-lane traveling vehicle information, or other suitable information) is stored (e.g., for further analysis by an artificial intelligence component 504 such as for model generation and determination, prediction, and/or warning improvement). If a lane change cannot be safety executed (e.g., N at 1106), the process can proceed to 1108. At 1108, an alert signal associated with the collision can be generated (e.g., by the collision avoidance component 110). At 1110, a collision avoidance action as described herein can be executed (e.g., by the collision avoidance component 110). At 1112, data (e.g., vehicle speed, vehicle trajectory, distances between vehicles, location information, corresponding adjacent-lane traveling vehicle information, or other suitable information) associated with the alert and/or collision avoidance action can be stored (e.g., for further analysis by an artificial intelligence component 504 such as for model generation and determination, prediction, and/or warning improvement).

Figure 12:
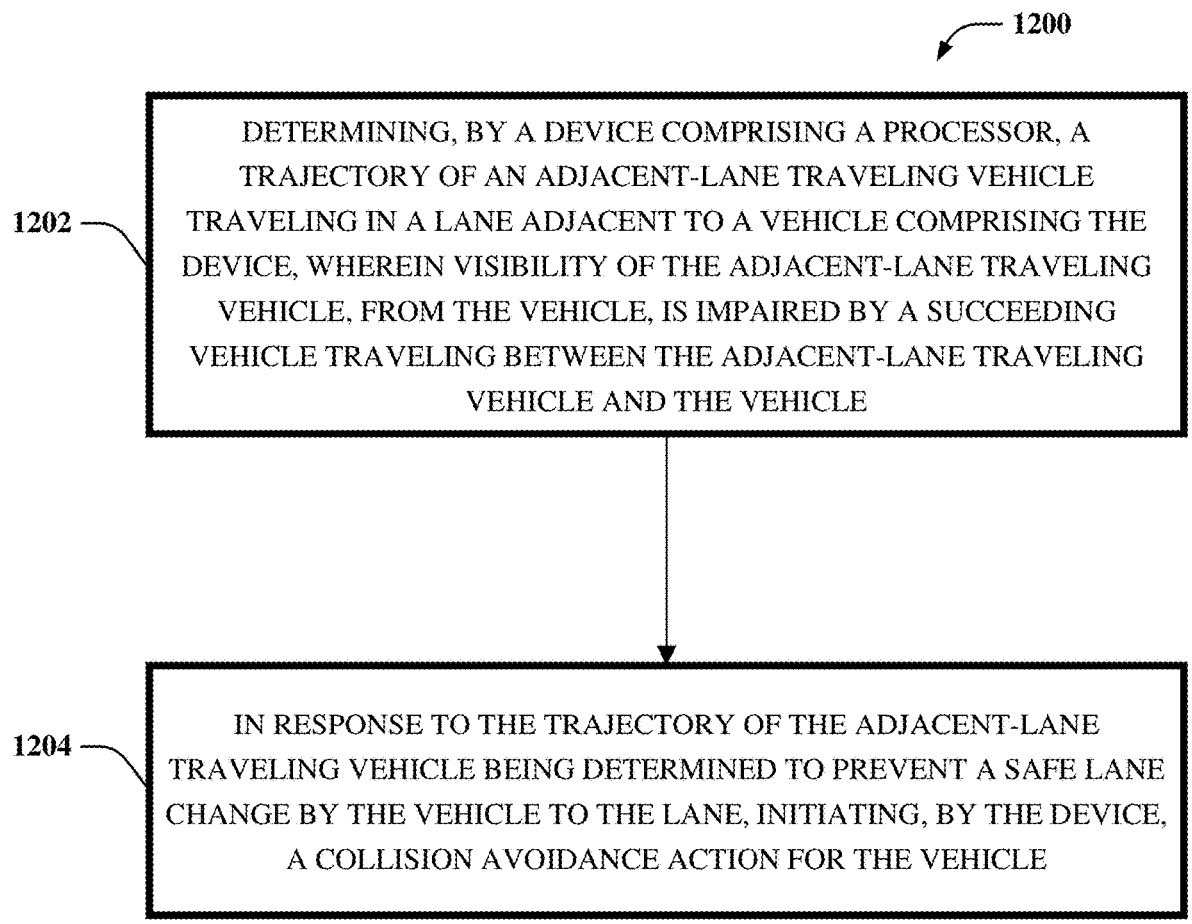
FIG. 12 illustrates a flow diagram of an exemplary collision mitigation process in accordance with one or more embodiments described herein.

FIG. 12 illustrates a flow diagram of an example, non-limiting computer-implemented method 1200 in accordance with one or more embodiments described herein. Repetitive description of like elements and/or processes employed in respective embodiments is omitted for sake of brevity. At 1202, computer-implemented method 1200 can comprise determining, by a device comprising a processor, a trajectory of an adjacent-lane traveling vehicle traveling in a lane adjacent to a vehicle comprising the device, wherein visibility of the adjacent-lane traveling vehicle, from the vehicle, is impaired by a succeeding vehicle traveling between the adjacent-lane traveling vehicle and the vehicle. At 1204, the computer-implemented method 1200 can comprise in response to the trajectory of the adjacent-lane traveling vehicle being determined to prevent a safe lane change by the vehicle to the lane, initiating, by the device, a collision avoidance action for the vehicle.

Figure 13:
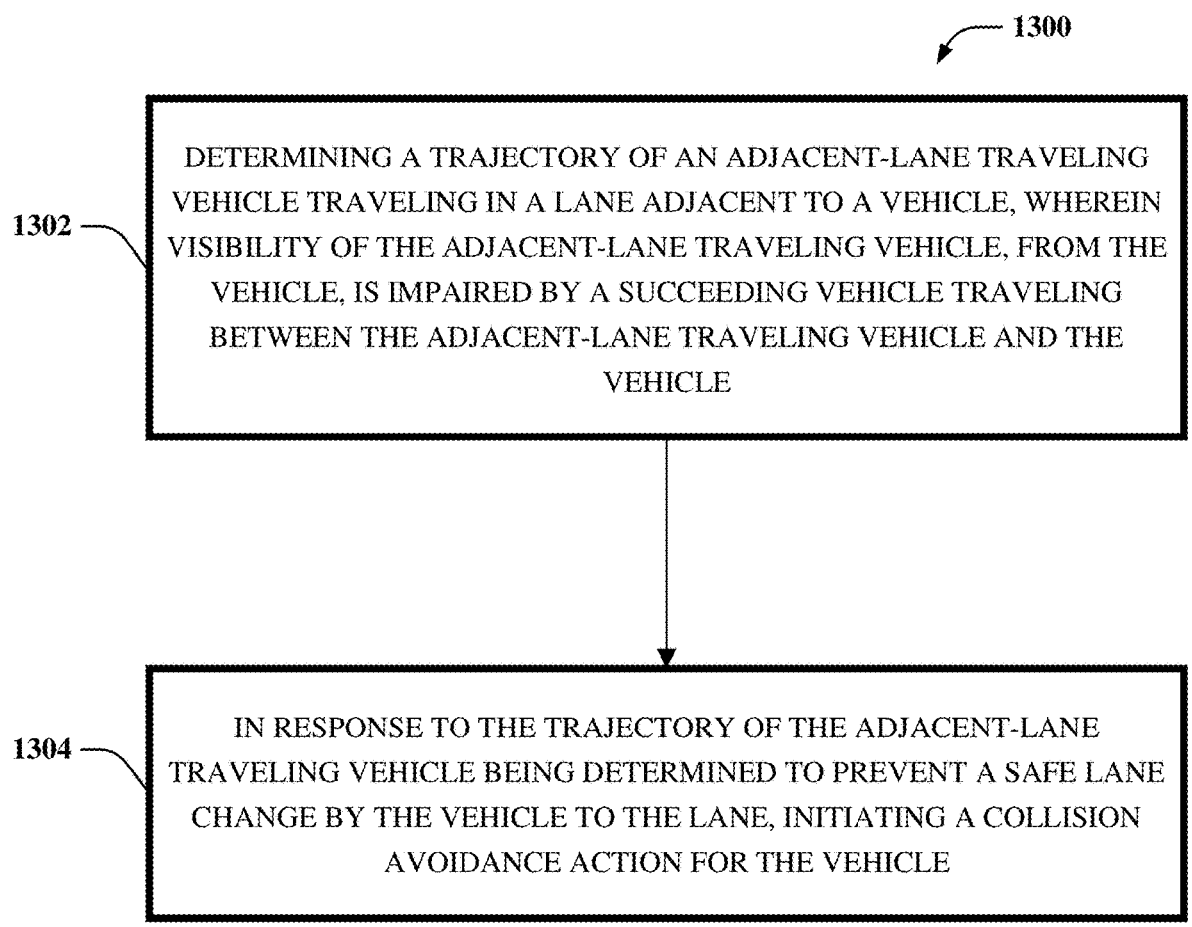
FIG. 13 illustrates a flow diagram of exemplary operations for collision mitigation as facilitated by a non-transitory machine-readable medium in accordance with one or more embodiments described herein.

FIG. 13 illustrates a flow diagram of example, non-limiting non-transitory machine-readable medium, comprising executable instructions that, when executed by a processor, facilitate performance of operations 1300 in in accordance with one or more embodiments described herein. Repetitive description of like elements and/or processes employed in respective embodiments is omitted for sake of brevity. At 1302, the operations 1300 can comprise determining a trajectory of an adjacent-lane traveling vehicle traveling in a lane adjacent to a vehicle, wherein visibility of the adjacent-lane traveling vehicle, from the vehicle, is impaired by a succeeding vehicle traveling between the adjacent-lane traveling vehicle and the vehicle. At 1304, the operations 1300 can comprise in response to the trajectory of the adjacent-lane traveling vehicle being determined to prevent a safe lane change by the vehicle to the lane, initiating a collision avoidance action for the vehicle.

Systems described herein can be coupled (e.g., communicatively, electrically, operatively, optically, etc.) to one or more local or remote (e.g., external) systems, sources, and/or devices (e.g., electronic control systems (ECU), classical and/or quantum computing devices, communication devices, etc.). For example, system 102 (or other systems, controllers, processors, etc.) can be coupled (e.g., communicatively, electrically, operatively, optically, etc.) to one or more local or remote (e.g., external) systems, sources, and/or devices using a data cable (e.g., High-Definition Multimedia Interface (HDMI), recommended standard (RS), Ethernet cable, etc.) and/or one or more wired networks described below.

In some embodiments, system herein can be coupled (e.g., communicatively, electrically, operatively, optically, etc.) to one or more local or remote (e.g., external) systems, sources, and/or devices (e.g., electronic control units (ECU), classical and/or quantum computing devices, communication devices, etc.) via a network. In these embodiments, such a network can comprise one or more wired and/or wireless networks, including, but not limited to, a cellular network, a wide area network (WAN) (e.g., the Internet), and/or a local area network (LAN). For example, system 102 can communicate with one or more local or remote (e.g., external) systems, sources, and/or devices, for instance, computing devices using such a network, which can comprise virtually any desired wired or wireless technology, including but not limited to: powerline ethernet, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In this example, system 102 can thus include hardware (e.g., a central processing unit (CPU), a transceiver, a decoder, an antenna (e.g., a ultra-wideband (UWB) antenna, a BLUETOOTH® low energy (BLE) antenna, etc.), quantum hardware, a quantum processor, etc.), software (e.g., a set of threads, a set of processes, software in execution, quantum pulse schedule, quantum circuit, quantum gates, etc.), or a combination of hardware and software that facilitates communicating information between a system herein and remote (e.g., external) systems, sources, and/or devices (e.g., computing and/or communication devices such as, for instance, a smart phone, a smart watch, wireless earbuds, etc.).

System herein can comprise one or more computer and/or machine readable, writable, and/or executable components and/or instructions that, when executed by processor (e.g., a processor 106 which can comprise a classical processor, a quantum processor, etc.), can facilitate performance of operations defined by such component(s) and/or instruction(s). Further, in numerous embodiments, any component associated with a system herein, as described herein with or without reference to the various figures of the subject disclosure, can comprise one or more computer and/or machine readable, writable, and/or executable components and/or instructions that, when executed by a processor, can facilitate performance of operations defined by such component(s) and/or instruction(s). Consequently, according to numerous embodiments, system herein and/or any components associated therewith as disclosed herein, can employ a processor (e.g., processor 106) to execute such computer and/or machine readable, writable, and/or executable component(s) and/or instruction(s) to facilitate performance of one or more operations described herein with reference to system herein and/or any such components associated therewith.

Systems herein can comprise any type of system, device, machine, apparatus, component, and/or instrument that comprises a processor and/or that can communicate with one or more local or remote electronic systems and/or one or more local or remote devices via a wired and/or wireless network. All such embodiments are envisioned. For example, a system (e.g., a system 502 or any other system or device described herein) can comprise a computing device, a general-purpose computer, a special-purpose computer, an onboard computing device, a communication device, an onboard communication device, a server device, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Figure 14:
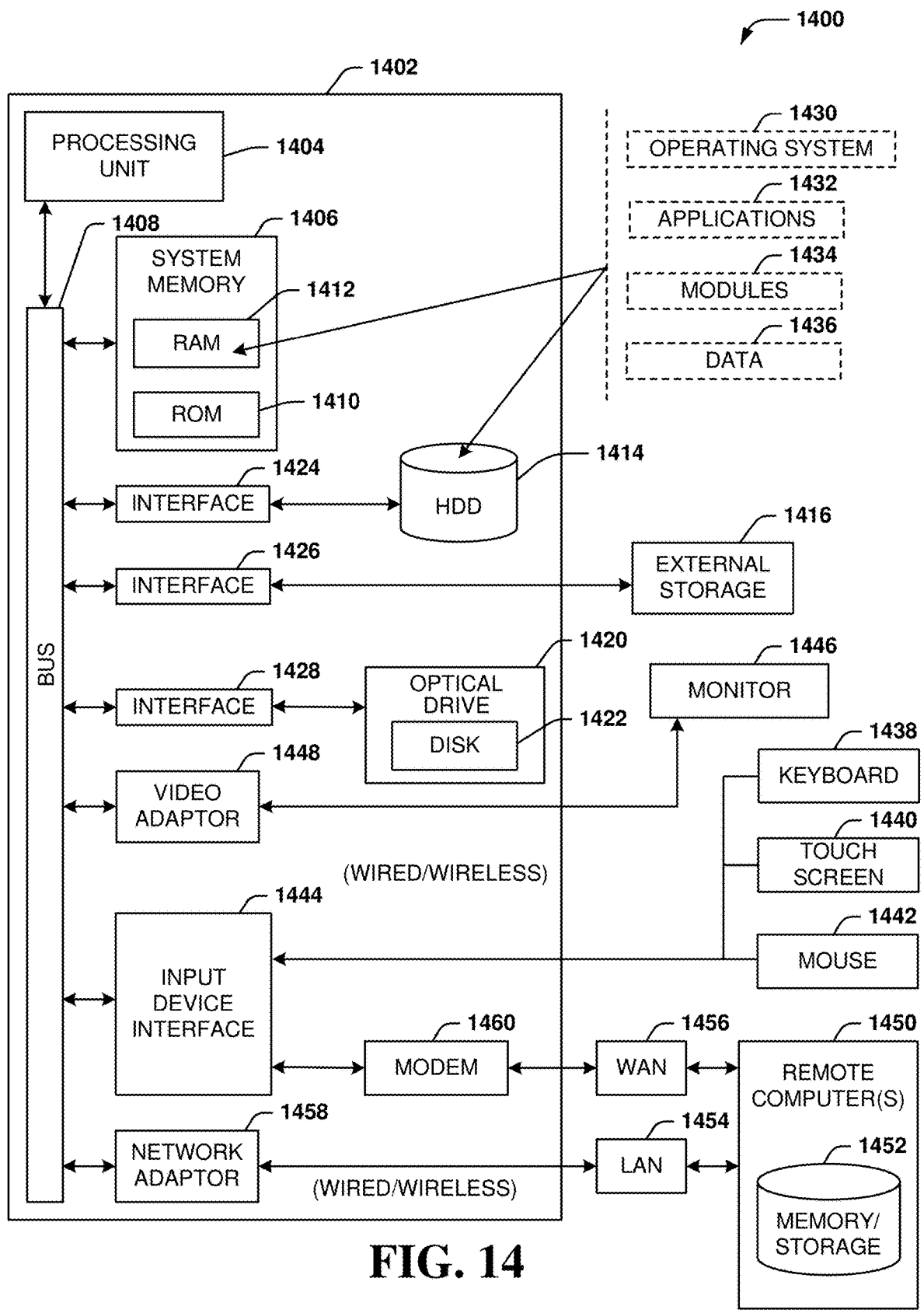
FIG. 14 is an example, non-limiting computing environment in which one or more embodiments described herein can be implemented.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid-state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 15:
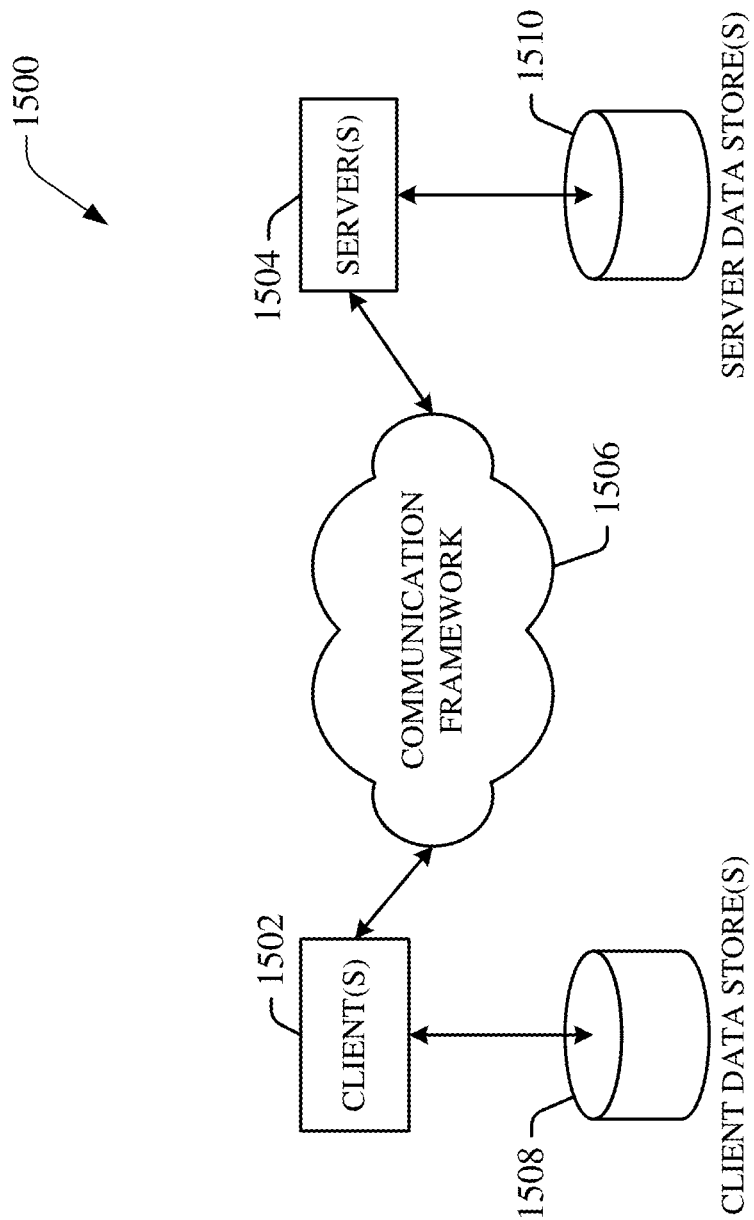
FIG. 15 is an example, non-limiting networking environment in which one or more embodiments described herein can be implemented.

Referring now to FIG. 15, there is illustrated a schematic block diagram of a computing environment 1500 in accordance with this specification. The system 1500 includes one or more client(s) 1502, (e.g., computers, smart phones, tablets, cameras, PDA's). The client(s) 1502 can be hardware and/or software (e.g., threads, processes, computing devices). The client(s) 1502 can house cookie(s) and/or associated contextual information by employing the specification, for example.

The system 1500 also includes one or more server(s) 1504. The server(s) 1504 can also be hardware or hardware in combination with software (e.g., threads, processes, computing devices). The servers 1504 can house threads to perform transformations of media items by employing aspects of this disclosure, for example. One possible communication between a client 1502 and a server 1504 can be in the form of a data packet adapted to be transmitted between two or more computer processes wherein data packets can include coded analyzed headspaces and/or input. The data packet can include a cookie and/or associated contextual information, for example. The system 1500 includes a communication framework 1506 (e.g., a global communication network such as the Internet) that can be employed to facilitate communications between the client(s) 1502 and the server(s) 1504.

Communications can be facilitated via a wired (including optical fiber) and/or wireless technology. The client(s) 1502 are operatively connected to one or more client data store(s) 1508 that can be employed to store information local to the client(s) 1502 (e.g., cookie(s) and/or associated contextual information). Similarly, the server(s) 1504 are operatively connected to one or more server data store(s) 1510 that can be employed to store information local to the servers 1504.

In one exemplary implementation, a client 1502 can transfer an encoded file, (e.g., encoded media item), to server 1504. Server 1504 can store the file, decode the file, or transmit the file to another client 1502. It is to be appreciated, that a client 1502 can also transfer uncompressed file to a server 1504 and server 1504 can compress the file and/or transform the file in accordance with this disclosure. Likewise, server 1504 can encode information and transmit the information via communication framework 1506 to one or more clients 1502.

The illustrated aspects of the disclosure can also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature can be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further aspects of the invention are provided by the subject matter of the following clauses:

1. A device, comprising:
    a memory; and
    a processor operatively coupled to the memory and comprising computer executable components comprising:
        a trajectory determination component that determines a trajectory of an adjacent-lane traveling vehicle traveling in a lane adjacent to a vehicle comprising the device, wherein visibility of the adjacent-lane traveling vehicle, from the vehicle, is impaired by a succeeding vehicle traveling between the adjacent-lane traveling vehicle and the vehicle; and
        a collision avoidance component that, in response to the trajectory of the adjacent-lane traveling vehicle being determined, by the trajectory determination component, to prevent a safe lane change by the vehicle to the lane, initiates a collision avoidance action for the vehicle.
2. The device of any preceding clause, wherein the collision avoidance component initiates the collision avoidance action in response to a determination by a lane change determination component that the vehicle is going to attempt a lane change.
3. The device of any preceding clause, wherein the vehicle is traveling on a road, comprising the lane, between a preceding vehicle traveling in the same lane as the vehicle and the succeeding vehicle, and wherein the determination, by the lane change determination component, that the vehicle is going to attempt the lane change comprises a determination by the lane change determination component that the vehicle is going to attempt the lane change to overtake the preceding vehicle.
4. The device of any preceding clause, wherein the road is a curved road.
5. The device of any preceding clause, wherein the computer executable components further comprise:
a communication component that receives warning information comprising a potential collision between the vehicle and the adjacent-lane traveling vehicle, from the preceding vehicle, wherein the trajectory is further determined, by the trajectory determination component, based on the warning information.
6. The device of any preceding clause, further comprising a blind spot monitoring sensor, wherein the trajectory determination component determines the trajectory of the adjacent-lane traveling vehicle based on an output received from the blind spot monitoring sensor.
7. The device of any preceding clause, wherein the blind spot monitoring sensor comprises a group of sensors.
8. The device of any preceding clause, wherein a sensor of the group of sensors comprises a rear-facing camera.
9. The device of any preceding clause, wherein a sensor of the group of sensors comprises a rear-facing radar sensor.
10. The device of any preceding clause, wherein a sensor of the group of sensors comprises a rear-facing lidar sensor.
11. The device of any preceding clause, wherein the computer executable components further comprise:
an artificial intelligence component that utilizes machine learning applied to past adjacent-lane traveling vehicle information representative of past trajectories of adjacent-lane traveling vehicles, from prior to the adjacent-lane traveling vehicle, to determine the trajectory of the adjacent-lane traveling vehicle.
12. The device of clause 1 above with any set of combinations of the devices 2-11 above.
13. A computer-implemented method, comprising:
determining, by a device comprising a processor, a trajectory of an adjacent-lane traveling vehicle traveling in a lane adjacent to a vehicle comprising the device, wherein visibility of the adjacent-lane traveling vehicle, from the vehicle, is impaired by a succeeding vehicle traveling between the adjacent-lane traveling vehicle and the vehicle; and
in response to the trajectory of the adjacent-lane traveling vehicle being determined to prevent a safe lane change by the vehicle to the lane, initiating, by the device, a collision avoidance action for the vehicle.

14. The computer-implemented method of any preceding clause, wherein the adjacent-lane traveling vehicle is determined to be traveling at a speed greater than the vehicle.
15. The computer-implemented method of any preceding clause, wherein the vehicle and a preceding vehicle are both located in a defined geographic risk zone, and wherein the computer-implemented method further comprises:
receiving warning data comprising information representative of a potential collision between the vehicle and the adjacent-lane traveling vehicle, from the preceding vehicle, wherein the trajectory is further determined based on the warning data.
16. The computer-implemented method of any preceding clause, wherein the defined geographic risk zone is determined using machine learning applied to collision information representative of past collisions or near-misses of other vehicles, from prior to the vehicle, to determine the defined geographic risk zone.
17. The computer-implemented method of any preceding clause, wherein the warning data is received directly from the preceding vehicle via direct vehicle-to-vehicle communication.
18. The computer-implemented method of any preceding clause, wherein the warning data is received from the preceding vehicle via cloud-based communication.
19. The computer-implemented method of clause 13 above with any set of combinations of the computer-implemented methods 14-18 above.
20. A non-transitory machine-readable medium, comprising executable instructions that, when executed by a processor, facilitate performance of operations, comprising:
determining a trajectory of an adjacent-lane traveling vehicle traveling in a lane adjacent to a vehicle, wherein visibility of the adjacent-lane traveling vehicle, from the vehicle, is impaired by a succeeding vehicle traveling between the adjacent-lane traveling vehicle and the vehicle; and
in response to the trajectory of the adjacent-lane traveling vehicle being determined to prevent a safe lane change by the vehicle to the lane, initiating a collision avoidance action for the vehicle.
21. The non-transitory machine-readable medium of any preceding clause, wherein the operations further comprise:
facilitating machine learning applied to past adjacent-lane traveling vehicle information representative of past trajectories of adjacent-lane traveling vehicles, from prior to the adjacent-lane traveling vehicle, to determine the trajectory of the adjacent-lane traveling vehicle.
22. The computer program product of any preceding clause, wherein the trajectory of the adjacent-lane traveling vehicle is determined based on an output received from a blind spot monitoring sensor communicatively coupled to the vehicle.
23. The non-transitory machine-readable medium of clause 20 above with any set of combinations of the non-transitory machine-readable mediums of clauses 21-22 above.

What is claimed is:
1. A device, comprising:
a memory; and
a processor operatively coupled to the memory and comprising computer executable components comprising:

a trajectory determination component that:
identifies an adjacent-lane traveling vehicle traveling at least partially in a first lane that is adjacent to a second lane in which a vehicle comprising the device is traveling, and
determines a trajectory of the adjacent-lane traveling vehicle, and
determines that the trajectory of the adjacent-lane traveling vehicle and a curvature of a road comprising the first lane and the second lane will cause visibility of the adjacent-lane traveling vehicle, from the vehicle, to be impaired by a succeeding vehicle traveling at least partially in the second lane, wherein the succeeding vehicle is behind the vehicle; and
a collision avoidance component that, in response to the trajectory of the adjacent-lane traveling vehicle and the impaired visibility of the adjacent-lane traveling vehicle from the vehicle, initiates a collision avoidance action for the vehicle to prevent the vehicle from making a lane change from the second lane to the first lane.

2. The device of claim 1, wherein the collision avoidance component initiates the collision avoidance action further in response to a determination by a lane change determination component that the vehicle is going to attempt a lane change.

3. The device of claim 2, wherein the vehicle is traveling on the road, between a preceding vehicle traveling in the second lane and the succeeding vehicle, and wherein the determination, by the lane change determination component, that the vehicle is going to attempt the lane change comprises the determination by the lane change determination component that the vehicle is going to attempt the lane change to overtake the preceding vehicle.

4. The device of claim 3, wherein the computer executable components further comprise:
a communication component that receives warning information comprising a potential collision between the vehicle and the adjacent-lane traveling vehicle, from the preceding vehicle, wherein the trajectory is further determined, by the trajectory determination component, based on the warning information.

5. The device of claim 1, further comprising a blind spot monitoring sensor, wherein the trajectory determination component determines the trajectory of the adjacent-lane traveling vehicle based on an output received from the blind spot monitoring sensor.

6. The device of claim 5, wherein the blind spot monitoring sensor comprises a group of sensors.

7. The device of claim 6, wherein a sensor of the group of sensors comprises a rear-facing camera.

8. The device of claim 6, wherein a sensor of the group of sensors comprises a rear-facing radar sensor.

9. The device of claim 6, wherein a sensor of the group of sensors comprises a rear-facing lidar sensor.

10. The device of claim 1, wherein the computer executable components further comprise:
an artificial intelligence component that utilizes machine learning applied to past adjacent-lane traveling vehicle information representative of past trajectories of adjacent-lane traveling vehicles, from prior to the adjacent-lane traveling vehicle, to determine the trajectory of the adjacent-lane traveling vehicle.

11. A computer-implemented method, comprising:
identifying, by a device comprising a processor, an adjacent-lane traveling vehicle traveling at least partially in a first lane that is adjacent to a second lane in which a vehicle comprising the device is traveling;
determining, by the device, a trajectory of the adjacent-lane traveling vehicle
determining, by the device, that the trajectory of the adjacent-lane traveling vehicle and a curvature of a road comprising the first lane and the second lane will cause visibility of the adjacent-lane traveling vehicle, from the vehicle, to be impaired by a succeeding vehicle traveling at least partially in the second lane, wherein the succeeding vehicle is behind the vehicle; and
in response to the trajectory of the adjacent-lane traveling vehicle and the impaired visibility of the adjacent-lane traveling vehicle from the vehicle, initiating, by the device, a collision avoidance action for the vehicle to prevent the vehicle from making a lane change from the second lane to the first lane.

12. The computer-implemented method of claim 11, wherein the adjacent-lane traveling vehicle is determined to be traveling at a speed greater than the vehicle.

13. The computer-implemented method of claim 11, wherein the vehicle and a preceding vehicle traveling in the second are both located in a defined geographic risk zone, and the preceding vehicle is in front of the vehicle, and wherein the computer-implemented method further comprises:
receiving warning data comprising information representative of a potential collision between the vehicle and the adjacent-lane traveling vehicle, from the preceding vehicle, wherein the trajectory is further determined based on the warning data.

14. The computer-implemented method of claim 13, wherein the defined geographic risk zone is determined using machine learning applied to collision information representative of past collisions or near-misses of other vehicles, from prior to the vehicle, to determine the defined geographic risk zone.

15. The computer-implemented method of claim 13, wherein the warning data is received directly from the preceding vehicle via direct vehicle-to-vehicle communication.

16. The computer-implemented method of claim 13, wherein the warning data is received from the preceding vehicle via cloud-based communication.

17. A non-transitory machine-readable medium, comprising executable instructions that, when executed by a processor of a vehicle, facilitate performance of operations, comprising:
identifying an adjacent-lane traveling vehicle traveling at least partially in a first lane that is adjacent to a second lane in which the vehicle is traveling;
determining a trajectory of an adjacent-lane traveling vehicle
determining, by the device, that the trajectory of the adjacent-lane traveling vehicle and a curvature of a road comprising the first lane and the second lane will cause visibility of the adjacent-lane traveling vehicle, from the vehicle, to be impaired by a succeeding vehicle traveling at least partially in the second lane, wherein the succeeding vehicle is behind the vehicle; and
in response to the trajectory of the adjacent-lane traveling vehicle and the impaired visibility of the adjacent-lane traveling vehicle from the vehicle, initiating a collision avoidance action for the vehicle to prevent the vehicle from making a lane change from the second lane to the first lane.

18. The non-transitory machine-readable medium of claim 17, wherein the operations further comprise:

facilitating machine learning applied to past adjacent-lane traveling vehicle information representative of past trajectories of adjacent-lane traveling vehicles, from prior to the adjacent-lane traveling vehicle, to determine the trajectory of the adjacent-lane traveling vehicle.

19. The non-transitory machine-readable medium of claim 17, wherein the trajectory of the adjacent-lane traveling vehicle is determined based on an output received from a blind spot monitoring sensor communicatively coupled to the vehicle.

20. The non-transitory machine-readable medium of claim 19, wherein the blind spot monitoring sensor comprises a group of sensors.

* * * * *